(12) United States Patent
Tyler et al.

(10) Patent No.: US 10,967,569 B2
(45) Date of Patent: Apr. 6, 2021

(54) ADDITIVE MANUFACTURING SYSTEM HAVING INTERCHANGEABLE NOZZLE TIPS

(71) Applicant: CC3D LLC, Coeur d'Alene, ID (US)

(72) Inventors: Kenneth L. Tyler, Coeur d'Alene, ID (US); Ryan C Stockett, Lebanon, NH (US)

(73) Assignee: Continuous Composites Inc., Coeur d'Alene, ID (US)

( * ) Notice: Subject to any disclaimer, the term of this patent is extended or adjusted under 35 U.S.C. 154(b) by 579 days.

(21) Appl. No.: 15/722,169

(22) Filed: Oct. 2, 2017

(65) Prior Publication Data

US 2018/0126638 A1    May 10, 2018

Related U.S. Application Data

(60) Provisional application No. 62/417,709, filed on Nov. 4, 2016.

(51) Int. Cl.
*B29C 64/209*    (2017.01)
*B33Y 30/00*    (2015.01)
(Continued)

(52) U.S. Cl.
CPC .......... *B29C 64/209* (2017.08); *B29C 64/106* (2017.08); *B29C 64/118* (2017.08); *B29C 64/141* (2017.08); *B29C 64/165* (2017.08); *B29C 64/20* (2017.08); *B29C 64/227* (2017.08); *B29C 64/245* (2017.08); *B29C 64/264* (2017.08); *B29C 64/291* (2017.08);
(Continued)

(58) Field of Classification Search
CPC ......... B33Y 30/00; B33Y 50/02; B33Y 40/00; B29C 64/118; B29C 70/384; B29C 64/209; B29C 64/291; B29C 64/245; B29C 64/264; B29C 64/336; B29C 64/307; B29C 64/379
See application file for complete search history.

(56) References Cited

U.S. PATENT DOCUMENTS 3,286,305 A    11/1966    Seckel
3,809,514 A    5/1974    Nunez
(Continued)

FOREIGN PATENT DOCUMENTS

DE    4102257 A1    7/1992
EP    2589481 B1    11/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Timothy Kennedy
*Assistant Examiner* — Olukorede Esan
(74) *Attorney, Agent, or Firm* — Ryan C. Stockett (57) ABSTRACT

A head is disclosed for use with an additive manufacturing system. The head may include a matrix reservoir, a first nozzle tip, and a second nozzle tip. The head may also include a tip changer mechanically connected between the first nozzle tip, the second nozzle tip, and the matrix reservoir.

20 Claims, 2 Drawing Sheets

(51) Int. Cl.
*B33Y 40/00* (2020.01)
*B29C 64/118* (2017.01)
*B29C 64/20* (2017.01)
*B29C 64/393* (2017.01)
*B29C 70/38* (2006.01)
*B29C 64/245* (2017.01)
*B29C 64/141* (2017.01)
*B29C 64/264* (2017.01)
*B29C 64/307* (2017.01)
*B29C 64/379* (2017.01)
*B29C 64/336* (2017.01)
*B29C 64/165* (2017.01)
*B29C 64/40* (2017.01)
*B33Y 50/02* (2015.01)
*B29C 64/386* (2017.01)
*B29C 64/106* (2017.01)
*B29C 64/291* (2017.01)
*B29C 64/227* (2017.01)
*B33Y 10/00* (2015.01)
*B29C 35/08* (2006.01)
*B29C 35/02* (2006.01)
*B29K 105/08* (2006.01)
*B29B 15/12* (2006.01)
*B29C 70/52* (2006.01)
*B29C 31/04* (2006.01)
*B29C 64/259* (2017.01)
*B33Y 70/00* (2020.01)
*B29C 64/295* (2017.01)

(52) U.S. Cl.
CPC .......... *B29C 64/307* (2017.08); *B29C 64/336* (2017.08); *B29C 64/379* (2017.08); *B29C 64/386* (2017.08); *B29C 64/393* (2017.08); *B29C 64/40* (2017.08); *B29C 70/384* (2013.01); *B33Y 30/00* (2014.12); *B33Y 40/00* (2014.12); *B33Y 50/02* (2014.12); *B29B 15/122* (2013.01); *B29C 31/042* (2013.01); *B29C 35/0261* (2013.01); *B29C 64/259* (2017.08); *B29C 64/295* (2017.08); *B29C 70/524* (2013.01); *B29C 2035/0827* (2013.01); *B29C 2035/0855* (2013.01); *B29K 2105/08* (2013.01); *B33Y 10/00* (2014.12); *B33Y 70/00* (2014.12)

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,296,335 A | 3/1994 | Thomas et al. | |
| 5,340,433 A | 8/1994 | Crump | |
| 5,746,967 A | 5/1998 | Hoy et al. | |
| 5,866,058 A | 2/1999 | Batchelder et al. | |
| 5,936,861 A * | 8/1999 | Jang ................... | B33Y 10/00 700/98 |
| 6,153,034 A | 11/2000 | Lipsker | |
| 6,459,069 B1 | 10/2002 | Rabinovich | |
| 6,501,554 B1 | 12/2002 | Hackney et al. | |
| 6,799,081 B1 | 9/2004 | Hale et al. | |
| 6,803,003 B2 | 10/2004 | Rigali et al. | |
| 6,934,600 B2 | 8/2005 | Jang et al. | |
| 7,039,485 B2 | 5/2006 | Engelbart et al. | |
| 7,555,404 B2 | 6/2009 | Brennan et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0225193 A1 * | 9/2007 | Kuhlman ............... | A61K 8/046 510/370 |
| 2007/0228592 A1 | 10/2007 | Dunn et al. | |
| 2008/0176092 A1 | 7/2008 | Owens | |
| 2009/0095410 A1 | 4/2009 | Oldani | |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0164498 A1 | 6/2013 | Langone et al. | |
| 2013/0209600 A1 * | 8/2013 | Tow ................... | B33Y 30/00 425/375 |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 * | 3/2014 | Tyler ................... | B29C 64/106 264/401 |
| 2014/0159284 A1 | 6/2014 | Leavitt | |
| 2014/0232035 A1 | 8/2014 | Bheda | |
| 2014/0242208 A1 * | 8/2014 | Elsworthy ............ | B29C 31/042 425/375 |
| 2014/0268604 A1 | 9/2014 | Wicker et al. | |
| 2014/0291886 A1 | 10/2014 | Mark et al. | |
| 2015/0108677 A1 | 4/2015 | Mark et al. | |
| 2015/0136455 A1 | 5/2015 | Fleming | |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |
| 2016/0082641 A1 | 3/2016 | Bogucki et al. | |
| 2016/0082659 A1 | 3/2016 | Hickman et al. | |
| 2016/0107379 A1 | 4/2016 | Mark et al. | |
| 2016/0114532 A1 | 4/2016 | Schirtzinger et al. | |
| 2016/0136885 A1 | 5/2016 | Nielsen-Cole et al. | |
| 2016/0144565 A1 | 5/2016 | Mark et al. | |
| 2016/0144566 A1 | 5/2016 | Mark et al. | |

(56) References Cited

U.S. PATENT DOCUMENTS

| | | |
|---|---|---|
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | | |
|---|---|---|---|
| EP | 3219474 A1 | 9/2017 | |
| KR | 100995983 B1 | 11/2010 | |
| KR | 101172859 B1 | 8/2012 | |
| WO | 2013017284 A2 | 2/2013 | |
| WO | 2017087663 A1 | 5/2014 | |
| WO | 2017108758 A1 | 6/2014 | |
| WO | 2016088042 A1 | 6/2016 | |
| WO | 2016088048 A1 | 6/2016 | |
| WO | 2016088049 A1 | 6/2016 | |
| WO | WO2016088049 A1 * | 6/2016 | ............ B33Y 30/00 |
| WO | 2016110444 A1 | 7/2016 | |
| WO | 2016159259 A1 | 10/2016 | |
| WO | 2016196382 A1 | 12/2016 | |
| WO | 2017006178 A1 | 1/2017 | |
| WO | 2017006324 A1 | 1/2017 | |
| WO | 2017051202 A1 | 3/2017 | |
| WO | 2017081253 A1 | 5/2017 | |
| WO | 2017085649 A1 | 5/2017 | |
| WO | 2017122941 A1 | 7/2017 | |
| WO | 2017122942 A1 | 7/2017 | |
| WO | 2017122943 A1 | 7/2017 | |
| WO | 2017123726 A1 | 7/2017 | |
| WO | 2017124085 A1 | 7/2017 | |
| WO | 2017126476 A1 | 7/2017 | |
| WO | 2017126477 A1 | 7/2017 | |
| WO | 2017137851 A2 | 8/2017 | |
| WO | 2017142867 A1 | 8/2017 | |
| WO | 2017150186 A1 | 9/2017 | |

OTHER PUBLICATIONS

A. Endruweit, M. S. Johnson, & a. C. Long, Curing of Composite Components by Ultraviolet Radiation: A Review, Polymer Composites, pp. 119-128 (Apr. 2006).

C. Fragassa, & G, Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bloinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinyiester Composite, Composite Structures, vol. 86, pp. 22-26 (Mar. 2008).

S. Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

(56) References Cited

OTHER PUBLICATIONS

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-805 (May 15, 2012).

International Search Report dated Feb. 9, 2018 for PCT/US2017/05672 to CC3D LLC Filed Nov. 2, 2017.

* cited by examiner

ADDITIVE MANUFACTURING SYSTEM HAVING INTERCHANGEABLE NOZZLE TIPS

RELATED APPLICATIONS

This application is based on and claims the benefit of priority from U.S. Provisional Application No. 62/417,709 that was filed on Nov. 4, 2016, the contents of which are expressly incorporated herein by reference.

TECHNICAL FIELD

The present disclosure relates generally to a manufacturing system and, more particularly, to an additive manufacturing system having interchangeable nozzle tips.

BACKGROUND

Additive manufacturing is a process of creating three-dimensional parts by depositing overlapping layers of material onto a print bed, under the guided control of a computer. One technique of additive manufacturing is known as fused-deposition modeling (FDM). In FDM, a heated thermoplastic is pushed through a print head having a desired cross-sectional shape and size. The print head is moved in a predefined 2-dimensional trajectory as the thermoplastic discharges from the print head, such that the thermoplastic is laid down on the print bed in a particular pattern and shape of overlapping layers. The thermoplastic, after exiting the print head, hardens into a final form. Another technique of additive manufacturing is known as continuous composite three-dimensional printing (CC3D). In CC3D, a continuous fiber is connected to an existing anchor point (e.g., to the print bed), and then pushed and/or pulled through the print head along with a thermoset resin to act as reinforcement for the solidified part. Upon exiting the head, one or more cure enhancers mounted to the head instantly cure the thermoset resin, allowing for 3-dimensional printing in free-space.

Although both FDM and CC3D printing techniques can be used to fabricate parts that are acceptable for many applications, these techniques may be limited due to a configuration (e.g., size and/or shape) of a nozzle tip connected to the system. For example, a first tip having a circular orifice may be configured to discharge a single fiber or round tow of fibers, while a second tip having a rectangular orifice may be configured to discharge a ribbon or sheet of fibers. Fabrication of some structures may require dynamic swapping between nozzle tips, and it may be difficult and time consuming to make the swap. In addition, the fabrication process may need to be interrupted for the swap to be completed.

The disclosed system is directed to addressing one or more of the problems set forth above and/or other problems of the prior art.

SUMMARY

In one aspect, the present disclosure is directed to a head for an additive manufacturing system. The head may include a matrix reservoir, a first nozzle tip, and a second nozzle tip. The head may also include a tip changer mechanically connected between the first nozzle tip, the second nozzle tip, and the matrix reservoir.

In another aspect, the present disclosure is directed to another additive manufacturing system. This additive manufacturing system may include a moveable support, and a matrix reservoir operatively connected to an end of the moveable support. The additive manufacturing system may also include a first nozzle module having a first tip with a rectangular orifice, and a first arrangement of cure enhancers located around the first tip, a second nozzle module having a second tip with a circular orifice, and a second arrangement of cure enhancers located around the second tip, and a tip changer mechanically connected to the first and second nozzle modules. The additive manufacturing system may further include a controller in communication with the tip changer, the moveable support, and the cure enhancer. The controller may be configured to receive specifications for a structure to be manufactured by the additive manufacturing system, and selectively coordinate operation of the tip changer, the moveable support and the cure enhancer based on the specifications.

In yet another aspect, the present disclosure is directed to a method of additively manufacturing a composite structure. The method may include directing a first reinforcement through a matrix reservoir to wet the first reinforcement, and discharging the first reinforcement through a first nozzle tip. The method may also include directing a second reinforcement through the matrix reservoir to wet the second reinforcement, activating a tip changer to cause a second nozzle tip to replace the first nozzle tip, and discharging the second reinforcement through the second nozzle tip.

DETAILED DESCRIPTION

Figure 1:
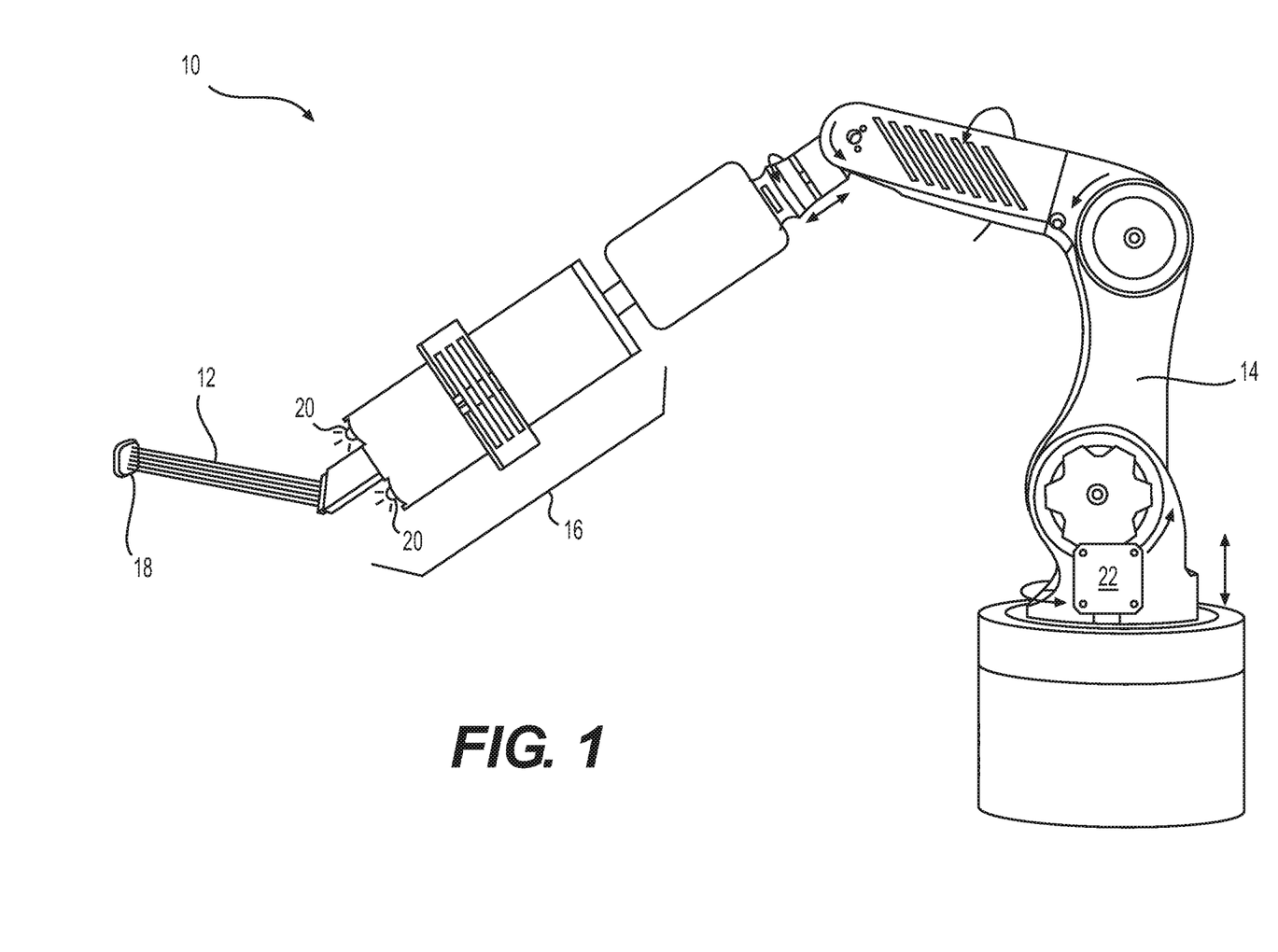
FIG. 1 is a diagrammatic illustrations of an exemplary disclosed manufacturing system.

FIG. 1 illustrates an exemplary system 10, which may be used to continuously manufacture a composite structure 12 having any desired cross-sectional shape (e.g., circular, polygonal, etc.). System 10 may include at least a support 14 and a head 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of multi-axis movements, it is contemplated that any other type of support 14 capable of moving head 16 in the same or in a different manner could also be utilized, if desired. In some embodiments, a drive may mechanically couple head 16 to support 14, and may include components that cooperate to move and/or supply power or materials to head 16.

Head 16 may be configured to receive or otherwise contain a matrix material. The matrix material may include any type of matrix material (e.g., a liquid resin, such as a zero volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside head 16 may be pressurized, for example by an external device (e.g., an extruder or another type of pump—not shown) that is fluidly connected to head 16 via a corresponding conduit (not shown). In another embodiment, however, the pressure may be generated completely inside of head 16 by a similar type of device. In yet other embodiments, the matrix material may be gravity-fed through and/or mixed within head 16. In some instances, the matrix material inside head 16 may need to be kept cool and/or dark to inhibit premature curing; while in other instances, the matrix material may need to be kept warm for the same reason. In either situation, head 16 may be specially configured (e.g., insulated, chilled, and/or warmed) to provide for these needs.

The matrix material may be used to coat, encase, or otherwise surround any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix material discharging from head 16.

The reinforcements may be exposed to (e.g., coated with) the matrix material while the reinforcements are inside head 16, while the reinforcements are being passed to head 16 (e.g., as a pre-preg material), and/or while the reinforcements are discharging from head 16, as desired. The matrix material, dry reinforcements, and/or reinforcements that are already exposed to the matrix material (e.g., wetted reinforcements) may be transported into head 16 in any manner apparent to one skilled in the art.

The matrix material and reinforcement may be discharged from head 16 via at least two different modes of operation. In a first mode of operation, the matrix material and reinforcement are extruded (e.g., pushed under pressure and/or mechanical force) from head 16, as head 16 is moved by support 14 to create the 3-dimensional shape of structure 12. In a second mode of operation, at least the reinforcement is pulled from head 16, such that a tensile stress is created in the reinforcement during discharge. In this mode of operation, the matrix material may cling to the reinforcement and thereby also be pulled from head 16 along with the reinforcement, and/or the matrix material may be discharged from head 16 under pressure along with the pulled reinforcement. In the second mode of operation, where the matrix material is being pulled from head 16, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from head 16 as a result of head 16 moving away from an anchor point 18. In particular, at the start of structure-formation, a length of matrix-impregnated reinforcement may be pulled and/or pushed from head 16, deposited onto anchor point 18, and cured, such that the discharged material adheres to anchor point 18. Thereafter, head 16 may be moved away from anchor point 18, and the relative movement may cause the reinforcement to be pulled from head 16. It should be noted that the movement of the reinforcement through head 16 could be assisted (e.g., via internal feed mechanisms), if desired. However, the discharge rate of the reinforcement from head 16 may primarily be the result of relative movement between head 16 and anchor point 18, such that tension is created within the reinforcement. It is contemplated that anchor point 18 could be moved away from head 16 instead of or in addition to head 16 being moved away from anchor point 18.

One or more cure enhancers (e.g., one or more light sources, an ultrasonic emitter, a laser, a heater, a catalyst dispenser, a microwave generator, etc.) 20 may be mounted proximate (e.g., within, on, and/or trailing from) head 16 and configured to enhance a cure rate and/or quality of the matrix material as it is discharged from head 16. Cure enhancer 20 may be controlled to selectively expose internal and/or external surfaces of structure 12 to energy (e.g., light energy, electromagnetic radiation, vibrations, heat, a chemical catalyst or hardener, etc.) during the formation of structure 12. The energy may increase a rate of chemical reaction occurring within the matrix material, sinter the material, harden the material, or otherwise cause the material to cure as it discharges from head 16.

A controller 22 may be provided and communicatively coupled with support 14, head 16, and any number and type of cure enhancers 20. Controller 22 may embody a single processor or multiple processors that include a means for controlling an operation of system 10. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of models, lookup tables, graphs, and/or equations. In the disclosed embodiment, the maps are used by controller 22 to determine desired characteristics of cure enhancers 20, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired curing. Controller 22 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 20 such that structure 12 is produced in a desired manner.

Figure 2:
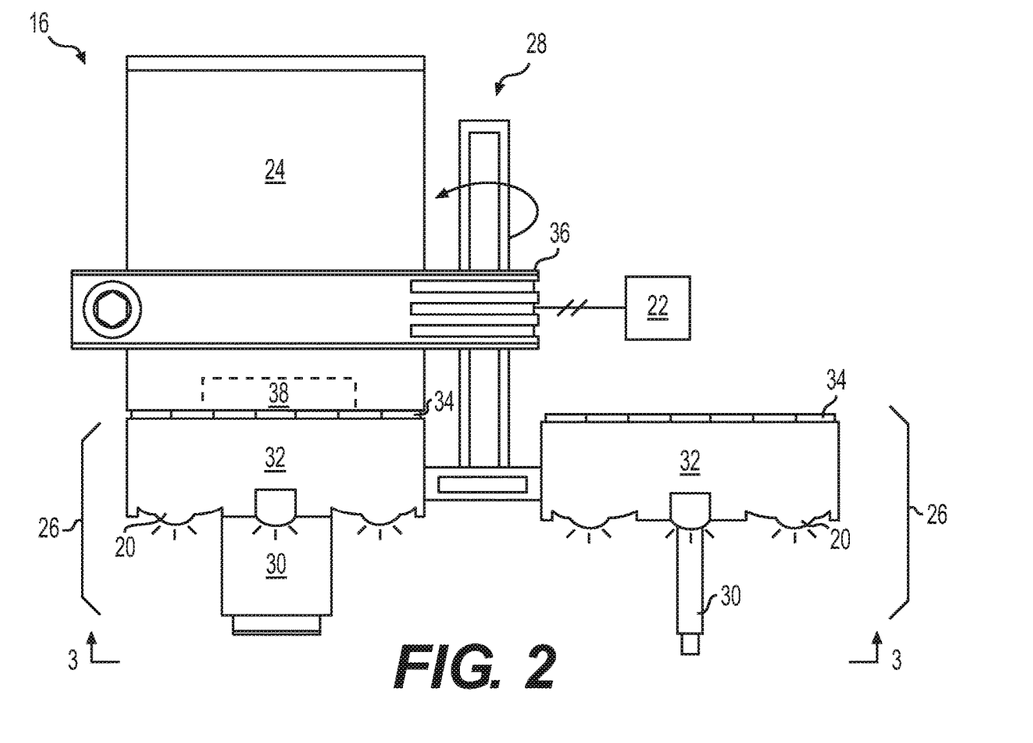
FIGS. 2 and 3 are diagrammatic illustration of an exemplary disclosed head that can be used in conjunction with the manufacturing system of FIG. 1.
Figure 3:
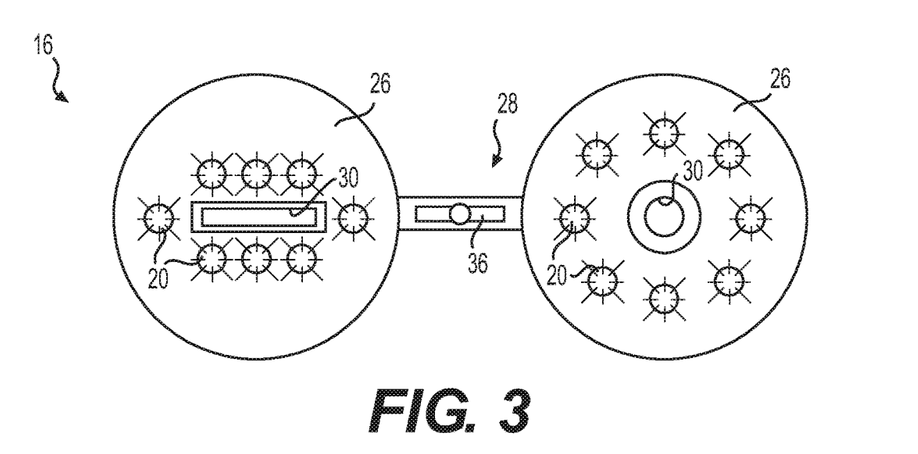

An exemplary head 16 is disclosed in detail in FIGS. 2 and 3. Head 16 may be modular, and include, among other things, a matrix reservoir 24 and a nozzle module 26 removably connected to matrix reservoir 24 (e.g., via a tip changer 28). In the left-most example of FIG. 2, nozzle module 26 includes a single- or multi-channel nozzle tip 30 configured to discharge composite material having a generally rectangular cross-section (e.g., a square tow, a flat ribbon, or a sheet of material that is prefabricated or fabricated in-situ from many of the same or different fibers). The configuration of head 16, however, may also allow nozzle module 26 to be automatically swapped out for another nozzle module 26 having a different nozzle tip 30 that discharges the same or a different composite material having another size and/or shape (e.g., a circular cross-section, a tubular cross-section, etc.—see the right-most example in FIG. 2). Each nozzle tip 30 may affect how the resin-coated reinforcements are discharged from head 16. For example, each nozzle tip 30 may have a different number of extrusion channels or orifices 31 formed therein, a different arrangement or shape of orifices 31, and/or different diameters of orifices 31. During the automated swap-out, matrix reservoir 24 may remain connected to support 16 (referring to FIG. 1), and few (if any) modifications of matrix reservoir 24 may be required.

In some embodiments, a mechanism 38 may be used to inhibit leakage of matrix from matrix reservoir 24 when nozzle module 26 is away from matrix reservoir 24 (e.g., during a nozzle swap). In one example, mechanism 38 may be a matrix control valve that is open when nozzle module 26 is connected to matrix reservoir 24, and closed when nozzle module 26 is disconnected. In another example, mechanism 38 may be configured regulate (e.g., reduce) pressures inside of matrix reservoir 24 to inhibit leakage. For example, mechanism 38 may be a vacuum line, pressure regulator, pump, etc.

In addition to nozzle tip 30, nozzle module 26 may also include a nozzle base 32 having a first end that connects to matrix reservoir 24, and an opposing second end that receives nozzle tip 30. A seal (e.g., gaskets, o-rings, etc.) 34 may be located between matrix reservoir 24 and the first end of nozzle base 32, if desired. In one embodiment, a threaded engagement (not shown) may be used to retain nozzle tip 30 in place within the opposing second end of nozzle base 32.

Cure enhancer(s) 20 may be mounted to a lower surface of nozzle base 32, at a same second end from which nozzle tip 30 extends. Any number of cure enhancers 20 may be used, and located around nozzle tip 30, for example in a configuration (e.g., size, shape, type, intensity, and/or arrangement) that is unique to the associated nozzle tip 30. As shown in the example of FIG. 3, when nozzle tip 30 has a generally rectangular shape, multiple cure enhancers 20a of a first type may be used, and arranged in a generally rectangular pattern around nozzle tip 30. And when nozzle tip 30 has a generally circular shape, multiple cure enhancers 20b may be used and arranged in a generally circular pattern around nozzle tip 30. With this configuration, it can be ensured that an appropriate amount of cure energy is provided by cure enhancers 20 for the particular nozzle tip 30 and reinforcement associated therewith.

Tip changer 28 may include, among other things, an actuator 36 that is operatively connected between matrix reservoir 24 and each of the different nozzle modules 26. Actuator 36 may be selectively energized by controller 22 to move (e.g., pivot) an existing nozzle module 26 away from matrix reservoir 24, and to move (e.g., pivot) a different nozzle module 26 into engagement with matrix reservoir 24. Any number of nozzle modules 26 may be moved by the same actuator 36, and dynamically pivoted into engagement with matrix reservoir 24 for use in fabricating structure 12 (referring to FIG. 1). Controller 22 may automatically implement nozzle module swapping (e.g., by selectively activating actuator 36) based on any number of different specifications for structure 12 (e.g., based on specifications stored in maps within the memory of controller 22).

It is contemplated that, instead of dynamically swapping out nozzle modules 26, it may be possible to swap out only nozzle tips 30, if desired. In this embodiment, although the configuration of cure enhancers 20 may be substantially unaffected by the swap, it may be possible for controller 22 to regulate operation of cure enhancers 20 differently according to the particular nozzle tip 30 currently connected to nozzle module 26. For example, controller 22 may selectively activate, deactivate, aim, and/or adjust the intensity level of particular cure enhancers 20 based on the particular nozzle tip 30 currently in use.

INDUSTRIAL APPLICABILITY

The disclosed system may be used to continuously manufacture composite structures having any desired cross-sectional shape and length. The composite structures may include any number of different fibers of the same or different types and of the same or different diameters. In addition, the disclosed system may be used to manufacture complex structures that have varying discharge requirements not normally possible with a single system. Operation of system 10 will now be described in detail.

At a start of a manufacturing event, information regarding a desired structure 12 may be loaded into system 10 (e.g., into controller 22 that is responsible for regulating operations of support 14, cure enhancers 20, and/or actuator 36 of tip changer 28). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), strength requirements, fiber orientations and/or shapes, etc. It should be noted that this information may alternatively or additionally be loaded into system 10 at different times and/or continuously during the manufacturing event, if desired. Based on the component information, one or more different reinforcements and/or matrix materials may be selectively installed and/or continuously supplied into system 10. In some embodiments, the fiber(s) may also need to be connected to a pulling machine (not shown) and/or to a mounting fixture (e.g., to anchor point 18). Installation of the matrix material may include filling head 16 and/or coupling of a particular nozzle module 26 (and/or tip 30) to head 16 (e.g., to matrix reservoir 24).

Head 16 may then be moved by support 14 under the regulation of controller 22 to cause matrix-coated reinforcements to be placed against or on the corresponding anchor point(s) 18. Cure enhancers 20 may then be selectively activated (e.g., turned on/off, aimed, overlapped, and/or intensity-adjusted by controller 22) to cause hardening of the matrix material surrounding the reinforcements, thereby bonding the reinforcements to anchor point(s) 18.

The component information may thereafter be used to control fabrication of structure 12. For example, the reinforcements may be pulled and/or pushed along with the matrix material from matrix reservoir 24 through nozzle module 26 (e.g., through nozzle tip 30). Support 14 may also selectively move head 16 in a desired manner, such that an axis of the resulting structure 12 follows a desired trajectory.

In some applications, where structure 12 has complex geometry, specifications of structure 12 may require the use of more than one nozzle module 26 (e.g., more than one nozzle tip 30 and corresponding cure enhancer arrangement). For example, structure 12 may have an internal skeleton or frame that is best fabricated using a nozzle tip 30 having a single round orifice 31 that discharges a single fiber or tow, and an external skin on the frame that is best fabricated using a nozzle tip 30 having a wide rectangular orifice 31 that can discharge ribbons or sheets of composite material. Controller 22 may be configured to automatically swap out nozzle modules 26 (or just nozzle tips 30) at a transition location, after the internal frame has been completed and in preparation for fabrication of the skin. Controller 22 may be further configured to regulate operation of cure enhancers 20 based on the particular nozzle module 26 and the corresponding arrangement of cure enhancers 20. Once structure 12 has grown to a desired shape and/or size, structure 12 may be severed from system 10 in any desired manner.

It will be apparent to those skilled in the art that various modifications and variations can be made to the disclosed system. Other embodiments will be apparent to those skilled in the art from consideration of the specification and practice of the disclosed system. For example, it is noted that during a nozzle-swap, the continuous fiber being discharged through the original and replacement nozzles will need to be severed and rethreaded; means for accomplishing these tasks are contemplated and may or may not be integral parts of the corresponding nozzle modules 26. It is intended that the specification and examples be considered as exemplary only, with a true scope being indicated by the following claims and their equivalents.

What is claimed is:

1. An additive manufacturing system, comprising:
   a moveable support;
   a matrix reservoir operatively connected to an end of the moveable support;
   a multi-channel nozzle module having a first tip with a rectangular orifice, and a first arrangement of cure enhancers located around the first tip;
   a single-channel nozzle module having a second tip with a circular orifice, and a second arrangement of cure enhancers located around the second tip;
   a tip changer mechanically connected to the multi-channel and single-channel nozzle modules; and
   a controller in communication with the tip changer, the moveable support, and the first and second arrangements of cure enhancers, the controller being configured to:
   receive specifications for a structure to be manufactured by the additive manufacturing system; and
   selectively coordinate operation of the tip changer, the moveable support and the first and second arrangements of cure enhancers based on the specifications.

2. The additive manufacturing system of claim 1, wherein:
   the first and second tips have an axial direction of discharge; and
   the tip changer has a pivot axis that is aligned with the axial direction of discharge to selectively move one of the first and second tips toward a discharge end the matrix reservoir to fluidly connect the one of the first and second tips with the matrix reservoir.

3. The additive manufacturing system of claim 2, further including an actuator mechanically connected to the tip changer and selectively actuated by the controller to cause pivoting of the tip changer.

4. The additive manufacturing system of claim 2, further including a seal located at the discharge end of the matrix reservoir and configured to engage only one of the multi-channel and single-channel nozzles at a time, wherein a non-engaged one of the multi-channel and single-channels nozzles is isolated from the matrix reservoir.

5. The additive manufacturing system of claim 1, wherein:
   the first arrangement of cure enhancers includes a plurality of cure enhancers arranged in a box around the rectangular orifice; and
   the second arrangement of cure enhancers includes a plurality of cure enhancers arranged in a circle around the circular orifice.

6. A method of additively manufacturing a composite structure, the method comprising:
   directing a single-tow reinforcement through a matrix reservoir to wet the single reinforcement;
   discharging the single-tow reinforcement through a single-channel nozzle tip;
   directing a multi-tow reinforcement through the matrix reservoir to wet the multi-tow reinforcement;
   activating a tip changer to cause a multi-channel nozzle tip to replace the single-channel nozzle tip; and
   discharging the multi-tow reinforcement through the multi-channel nozzle tip.

7. The method of claim 6, further including exposing the first and second reinforcements to a cure energy during discharging to cause a matrix coating to cure.

8. The method of claim 6, wherein the multi-tow reinforcement forms at least one of a ribbon and a sheet during discharge from the multi-channel nozzle tip.

9. The method of claim 6, wherein activating the tip changer to cause the multi-channel nozzle tip to replace the single-channel nozzle tip includes activating the tip changer to cause the single-channel nozzle tip to pivot away and isolate from the matrix reservoir, and the multi-channel nozzle tip to pivot into engagement and fluid communication with the matrix reservoir.

10. The method of claim 6, wherein discharging the multi-tow reinforcement through the multi-channel nozzle tip includes discharging the multi-tow reinforcement through a rectangular orifice.

11. The method of claim 6, wherein discharging the single-tow reinforcement through the single-channel nozzle tip includes discharging the single-tow reinforcement through a circular orifice.

12. An additive manufacturing system, comprising:
    a moveable support;
    a matrix reservoir operatively connected to an end of the moveable support and configured to receive a liquid matrix;
    a first nozzle tip having a discharge direction;
    a second nozzle tip having the discharge direction; and
    a tip changer mechanically connected between the first nozzle tip, the second nozzle tip, and the matrix reservoir, the tip changer configured to pivot the first and second nozzle tips about a pivot axis that is parallel with the discharge direction.

13. The additive manufacturing system of claim 12, wherein the tip changer is pivotal to selectively connect only one of the first and second nozzle tips to a discharge end the matrix reservoir at a time.

14. The additive manufacturing system of claim 13, further including an actuator mechanically connected to the tip changer and configured to cause pivoting of the tip changer.

15. The additive manufacturing system of claim 13, further including a seal located at the discharge end of the matrix reservoir.

16. The additive manufacturing system of claim 12, wherein the first nozzle tip includes a rectangular orifice.

17. The additive manufacturing system of claim 16, wherein the second nozzle tip includes a circular orifice.

18. The additive manufacturing system of claim 12, wherein:
   the first nozzle tip is mounted within a first nozzle module having a first arrangement of cure enhancers configured to cure a first type of matrix-coated reinforcement; and
   the second nozzle tip is mounted within a second nozzle module having a second arrangement of cure enhancers configured to cure a second type of matrix-coated reinforcement.

19. The additive manufacturing system of claim 18, wherein:
   the first type of matrix-coated reinforcement is at least one of a ribbon and a sheet; and
   the second type of matrix-coated reinforcement is at least one of a single strand and a tow.

20. The additive manufacturing system of claim 12, further including a valve configured to inhibit leakage of matrix from the matrix reservoir when the first and second nozzle tips are away from the matrix reservoir.

* * * * *